United States Patent [19]

Dreulle

[11] 4,070,260

[45] Jan. 24, 1978

[54] PROCESS OF SULFURIC ACID LEACHING SILICATED ZINC ORES

[75] Inventor: Noël Dreulle, Douai, France

[73] Assignee: Compagnie Royale Asturienne des Mines, Brussels, Belgium

[21] Appl. No.: 656,966

[22] Filed: Feb. 10, 1976

[30] Foreign Application Priority Data

Feb. 14, 1975 France .................. 75 04594

[51] Int. Cl.$^2$ .............................................. C25C 1/20
[52] U.S. Cl. .................................. 204/119; 423/109; 423/339
[58] Field of Search ............... 423/101, 109, 339; 204/118, 119; 75/120

[56] References Cited

U.S. PATENT DOCUMENTS

| | | | |
|---|---|---|---|
| 1,129,904 | 3/1915 | Rigg | 423/109 |
| 1,808,929 | 6/1931 | Mayer et al. | 423/109 |
| 1,843,006 | 1/1932 | Stevens et al. | 423/339 |
| 1,906,074 | 4/1933 | Mertes | 423/109 |
| 2,588,853 | 3/1952 | Kumins et al. | 423/339 |
| 3,954,937 | 5/1976 | Bodson | 423/109 |

Primary Examiner—O. R. Vertiz
Assistant Examiner—Brian E. Hearn
Attorney, Agent, or Firm—Young & Thompson

[57] ABSTRACT

A process of leaching silicated zinc ores with sulfuric acid in which the ore is reacted at elevated temperature with at least a stoichiometric amount of sulfuric acid, treating products of the reaction with a predetermined quantity of hot water, filtering the zinc sulfate solution from precipitated silica, washing with a further predetermined quantity of hot water (the total amount of hot water used being determined so as to obtain the desired concentration of zinc in solution). The zinc is later recovered electrolytically. A 1 to 6N sulfuric acid solution may be used in which case a gelatinous mass is formed upon reaction and then it is evaporated at 100° C of at least 60% of its water content. Alternatively the ore can be malaxated with about 20% stoichiometric excess concentrated sulfuric acid, and filtered at out at elevated temperature.

9 Claims, No Drawings

PROCESS OF SULFURIC ACID LEACHING SILICATED ZINC ORES

The present invention relates to a process of leaching silicated zinc ores with sulfuric acid.

There are numerous varieties of silicated zinc ores such as willemite ($SiO_4Zn_2$), hemimorphite ($Si_2O_7(OH) Zn_4 H_2O$). Such ores generally contain a high percentage of zinc (40 to 50%) but have not lent themselves to wide usage up to now because since they are not suitable for enrichment by flotation, they cannot be added in small amounts to roasted sulfur ores by reason of losses of zinc due to the formation of silicates, and in addition the classic leaching with sulfuric acid preceding electrolytic recovery of zinc from a sulfate solution leads to the formation of colloidal silica according to the following reaction

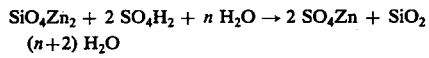

$$SiO_4Zn_2 + 2 SO_4H_2 + n H_2O \rightarrow 2 SO_4Zn + SiO_2 (n+2) H_2O$$

The colloidal silica prevents the filtration of zinc sulfate at high concentrations, as the entire solution becomes a gelatinous mass.

An object of the invention is a method of leaching silicated zinc ores which make it possible to obtain crystallized silica which is separable by filtration, wherein the improvement comprises the steps of: reacting at elevated temperature the silicated zinc ore with at least a stoichiometric amount of sulfuric acid, treating products of the reaction with a predetermined quantity of hot water, filtering the zinc sulfate solution from crystallized silica, and recovering the zinc sulfate solution for subsequent electrolytic extraction of the zinc.

By limiting the amount of hot water brought into contact with the silica, the silica crystallizes and losses its propensity to form gels at reversible degrees of hydration. It is then possible to treat the zinc sulfate solution with hot water and separate the subsequently formed zinc sulfate solution from the crystallized silica.

According to a first form of the process of the invention the silicated zinc ore is reacted near boiling temperature with a 1 to 6N sulfuric acid solution until the formation of a gelatinous mass, dehydrating the gelatinous mass near 100° C until evaporation of at least 60% of the water content, treating the dehydrated mass with predetermined quantity of hot water, filtering the treated mass, washing the precipitated silica with another predetermined quantity of hot water, and recovering the zinc sulfate solution for subsequently extracting the zinc electrolytically.

Advantageously the sulfuric acid solution is an acidified, zinc sulfate solution weakened in zinc by electrolysis.

Also there is an advantage to utilizing the acidified, zinc sulfate solution electrolytically weakened in zinc compared to the starting ore, the quantity of zinc in the ore substantially compensating for the amount of zinc extracted from the solution by electrolysis.

Preferably one liter of the acidified weakened in zinc, zinc sulfate solution containing about 175 g/l of free sulfuric acid and 60 g/l of zinc, is used for reacting with the silicated zinc ore containing about 90 g of zinc.

According to an alternative form of the process according to the invention, the silicated zinc ore is reacted by malaxing with a slight excess of the stoichiometric amount of sulfuric acid, treating products of the reaction with a predetermined quantity of water near its boiling point, filtering at elevated temperature the zinc sulfate from crystallized silica, and recovering the zinc sulfate solution for subsequently electrolytically removing the zinc.

Preferably the slight excess of the stoichiometric amount of concentrated sulfuric acid is about 20% and the predetermined amounts of hot water used for treatment and washing are such that the concentration of zinc in the recovered zinc sulfate is about 150 g/l.

Further features and advantages of the invention will be brought out in the following description and examples.

EXAMPLE 1

50 g of willemite containing 42.77% of zinc was reacted with 21.6 ml of concentrated sulfuric acid (i.e., a 20% excess of the stoichiometric amount). Products of the reaction were then ground in a malaxer with solid shot. The ground products were then treated in 100 ml of water which was then heated to a boil and held at a boil for 30 minutes. The hydrated mass was then filtered in a Buchner funnel, and later washed with hot water so that the total volume of the zinc sulfate solution filtrate was 150 ml. The filtering time, including washing, was less than five minutes. 17.8 g silica residue containing 0.50% zinc was obtained. The yield of recovered zinc was 99.50%.

EXAMPLE 2

25 g of willemite containing 43.8% zinc was reacted with 115 ml of solution coming from the electrolysis of zinc and having the following composition (i.e., the mean composition of the electrolyte whose zinc is spent, as is commonly found in the zinc industry).

| | |
|---|---|
| $SO_4H_2$ | 175 g/l |
| Zn | 60 g/l |
| Mn | 2 g/l |
| Mg | 10 g/l |

The reaction takes place at a boil; after about five minutes of boiling a gelatinous mass is obtained. The gelatinous mass is dried at 100° C until the evaporation of all the water of the reacting solution (about 100 g). The dried mass was then treated with 90 ml of boiling water, filtered in a Buchner funnel and washed twice with about 15 ml of boiling water. The total duration of filtering including washing was three minutes.

A 10 g silica residue was obtained containing 0.05% zinc and a solution of zinc sulfate containing 148 g/l. This concentration corresponds to the normal concentration of zinc extracted electrolyte. The zinc recovery yield in this example was 99.95%.

EXAMPLE 3

The same quantity of willemite as in Example 2 was again reacted. The gelatinous mass was dried at 100° C until evaporation of 60 g of water (i.e., 60% of the water content). Filtering plus washing took eight minutes. The yield in this example was substantially the same as that in Example 2.

The method of reacting concentrated sulfuric acid according to Example 1 is interesting by the simplicity of the extraction steps per se. On the other hand the recycling of the zinc sulfate solutions spent by the electrolytic extraction of zinc is costly since it presupposes the continuous concentration of the sulfuric acid, by evaporation or by dissolving sulfur trioxide. The zinc remaining in solution precipitates during concentration.

Although the form of the process in which the solution electrolytically spent in zinc has higher set up cost, it permits large savings in operating costs. Moreover, it will be appreciated that it is possible to balance the degree of dehydration of the silica gel as a function of the comparative costs of dehydration and filtration with longer durations of dehydration at higher filtering rates.

It is felt that the form of the process in which concentrated sulfuric acid reacts with the ore will be more advantageous namely for leaching reduced amounts of silicated ores in which case the recycling of the electrolytically spent solutions will not be required or will be a minor problem whereas the form of the process including the direct reaction with the electrolytically spent solutions will be more advantageous for processing large amounts.

The invention is of course suitable for numerous variations insofar as the concentrations of the reaction solution or final solutions are concerned without going beyond the scope of the present invention.

What I claim is:

1. A process of leaching silicated zinc ore with sulfuric acid comprising the steps of reacting silicated zinc ore with at least a stoichiometric amount of a 1N to 6N sulfuric acid solution near its boiling point until a gelatinous mass is formed containing hydrated silica and zinc sulfate, evaporating at least 60% of the water content of the gelatinous mass so that substantially all the silica crystallizes, treating the evaporated mass with hot water in a quantity effective to dissolve substantially all the zinc sulfate, filtering the crystallized silica from the zinc sulfate solution, and recovering the zinc sulfate solution for subsequent electrolytic extraction of zinc.

2. A process according to claim 1, further comprising washing the crystallized silica after filtering with additional hot water, the total quantity of water being determined so as to obtain a desired concentration of zinc in solution.

3. A process according to claim 1, further comprising producing the sulfuric acid solution by electrolytically extracting zinc from a zinc sulfate solution, thereby depleting the solution of zinc and enriching the solution in sulfuric acid, the quantity of zinc in the ore substantially compensating for the quantity of zinc previously extracted from the zinc sulfate solution.

4. A process according to claim 3, wherein the sulfuric acid solution is produced by electrolytic extraction of zinc from a zinc sulfate solution containing about 175 g/l of free sulfuric acid and 60 g/l of zinc, and is used for reacting the ore in the amount of one liter for a quantity of silicated zinc ore containing about 80 g of zinc.

5. A process according to claim 1, in which said reacting step is conducted at a boil.

6. A process according to claim 1, in which said hot water is boiling water.

7. A process of leaching silicated zinc ore with sulfuric acid comprising reacting the silicated zinc ore with at least a stoichiometric amount of concentrated sulfuric acid by malaxing the ore and acid to produce zinc sulfate, treating the products of the reaction with a predetermined quantity of water near its boiling point sufficient that the concentration of recovered zinc is about 150 g/l, filtering at elevated temperature the zinc sulfate solution, and recovering the zinc sulfate solution of a concentration of about 150 g/l zinc for subsequent electrolytic extraction of zinc.

8. A process according to claim 7, further comprising washing the crystallized silica with additional hot water, the total amount of hot water used in the treating and washing steps being determined so as to obtain a desired concentration of zinc in the zinc sulfate solution.

9. A process according to claim 8, wherein the stoichiometric excess of concentrated sulfuric acid is about 20%, and the total amount of hot water used in the treating and washing steps is determined so as the concentration of zinc in the recovered zinc sulfate solution is about 150 g/l.

* * * * *